Dec. 5, 1961  A. L. REDIGER  3,012,162
STATOR CORE MEMBER FOR DYNAMOELECTRIC MACHINES
Filed April 17, 1958
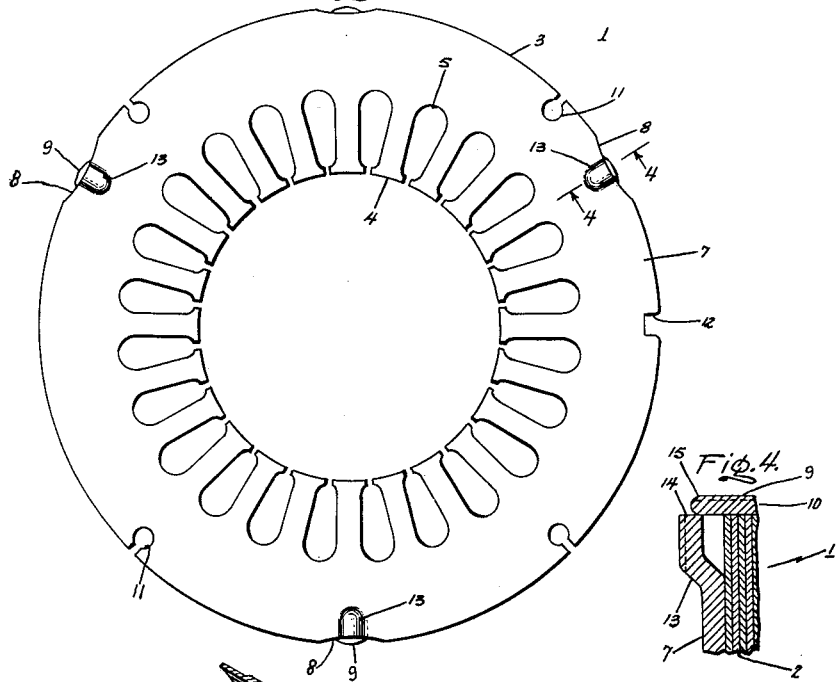
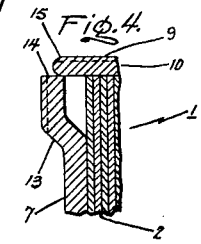
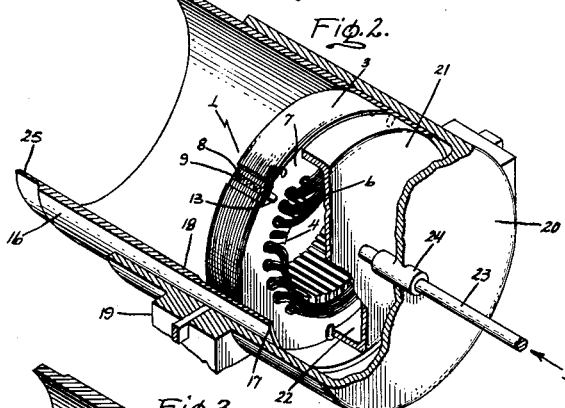
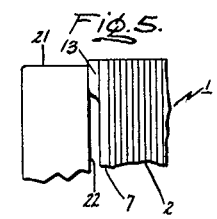
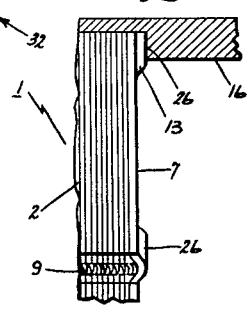
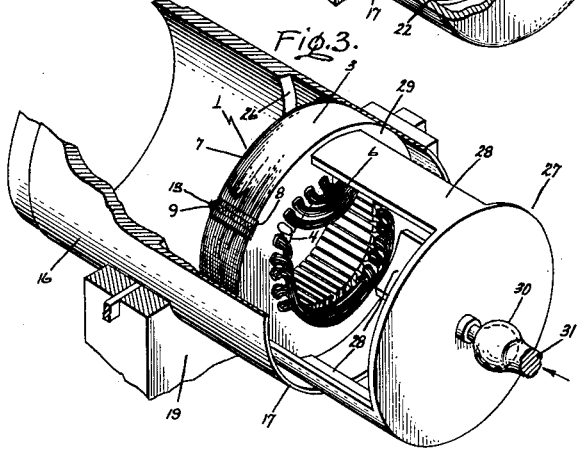
Inventor:
Alvin L. Rediger,
by H. F. Manbeck, Jr.
Attorney.

United States Patent Office 3,012,162
Patented Dec. 5, 1961

3,012,162
STATOR CORE MEMBER FOR DYNAMOELECTRIC MACHINES
Alvin L. Rediger, Holland, Mich., assignor to General Electric Company, a corporation of New York
Filed Apr. 17, 1958, Ser. No. 729,190
4 Claims. (Cl. 310—259)

This invention relates to dynamoelectric machines and more particularly to the stator core members for such machines.

Conventional dynamoelectric machines, and more particularly alternating current induction motors in the smaller frame sizes, include a stator member formed of a stacked plurality of relatively thin laminations of magnetic material and having a bore concentrically surrounding and defining an air gap with the rotor member; winding slots are formed in the stator member extending radially outward from the bore thereof in which the field windings of the motor are positioned.

In certain applications for alternating current motors, particularly in hermetically sealed refrigeration systems in which the motor and compressor driven thereby are mutually sealed within the refrigeration system, the stator core member of the motor is pressed into an outer shell; in hermetic motor-compressor assemblies, the compressor with the rotor of the motor mounted on its shaft is pressed into the same shell with the shell being subsequently closed and hermetically sealed, as by welding. In such assemblies, the stator core member is pressed into the shell by pushing on the face of one end lamination with sufficient force. It is, of course, essential that a concentric air gap be provided between the bore of the stator core member and the peripheral surface of the rotor, and it is thus necessary that the stator core member be concentrically disposed within the shell thus in turn requiring that the face of the core which is utilized as the pushing surface be square with the outside diameter and bore. Furthermore, in certain constructions, the stator core member may be located against surface, such as a shoulder or rabbet on the interior surface of the shell and again, in order to provide the requisite concentricity of the air gap of the assembled motor, it is necessary that the face of the stator core member which abuts such a rabbet surface be square with the outside diameter and bore.

In the past, it has been the practice to employ in the stator core member a relatively thick end lamination, i.e., for example .050 inch thick in contrast with the .025 inch thickness of the other laminations, such thick end lamination being arranged on the pushing face and/or the face of the stator core member ultimately abutting the internal rabbet surface of the shell. In order to provide the requisite squareness of the end face of the core with respect to the outside diameter and bore, it has been the general practice to machine the end lamination at the same time the outside diameter of the stator core member is turned. However, by virtue of the inherent weakness of the laminated core, it has been found that sufficient distortion or deflection has been present so that, even after machining, the surface of the thick end lamination is almost always a distorted plane. This has resulted in defeating the purpose of including the thick end lamination since, due to the distorted plane of the end lamination, the stator core member may not be concentrically pressed into the outer shell and further, it has been extremely difficult to measure the lack of concentricity since no plane surface for effecting such measurement has been available.

In addition, the stack of laminations comprising the stator core member of hermetic motors are conventionally held in assembled relation by a number of spaced apart weld beads formed across the outer periphery of the stator and such weld beads conventionally have small projections extending beyond each face of the core. Thus, in instances where the stator core member is to be pressed against a rabbet surface on the interior of the outer shell, it has in the past been necessary to grind off these weld bead extensions.

It is therefore desirable to provide a dynamoelectric machine stator core member particularly adapted for pressing into an outer shell in which a plane surface which is square with the outside diameter and bore of the stator core member is provided for pressing the stator core member into the shell and/or accurately locating the stator core member against a rabbet surface on the interior of the shell, such flat plane also permitting accurate measurement of the concentricity of the bore of the member. It is further desirable that such a stator core member eliminate the necessity for grinding off the projecting ends of the weld beads on the outer periphery of the member.

It is accordingly an object of my invention to provide an improved stator core member for a dynamoelectric machine which provides a flat plane square with the outside diameter and bore of the member for pressing the member into an outer shell and/or locating the member against a surface within the shell and further, for accurately checking the concentricity of the bore of the member.

Further objects and advantages of my invention will become apparent by reference to the following description and the accompanying drawing, and the features of novelty which characterize this invention will be pointed out with particularity in the claims annexed to and forming a part of this specification.

My invention in its broader aspects therefore provides a stator core member for a dynamoelectric machine comprising a stack of relatively thin laminations of magnetic material with at least one end lamination of the stack having at least three spaced apart projections formed on its face. In the preferred embodiment of my invention, the end lamination is substantially thicker than the other laminations comprising the core and the projections, which are preferably evenly spaced apart, have their faces machined to a plane square with the outside diameter and bore of the stator member. These projections therefore define a plane square with the outside diameter and bore of the stator core member which may be employed for pressing the stator core member into a shell and/or for locating the stator core member against a surface within the shell, and in addition, these projections extend axially beyond the projecting ends of the weld beads, thus eliminating the prior necessity for grinding off such weld bead extensions.

In the drawing,

FIG. 1 is an end view of an end lamination for a dynamoelectric machine stator core member incorporating my invention;

FIG. 2 is a view in perspective, partly broken away, showing the insertion of a stator core member employing an end lamination of the type shown in FIG. 1, being pressed into an outer shell;

FIG. 3 is another view in perspective, partly broken away, showing a stator core member employing an end lamination of the type shown in FIG. 1 being pressed into an outer shell for ultimate abutment against an inner rabbet surface in the shell;

FIG. 4 is a fragmentary cross-sectional view taken along the line 4—4 of FIG. 1;

FIG. 5 is a fragmentary side view further illustrating the construction shown in FIG. 2; and FIG. 6 is a fragmentary view, partly in cross-section, further illustrating the construction shown in FIG. 3.

Referring now to FIGS. 1 and 4 of the drawing, there is shown a stator core member, generally identified as 1 formed of a stack of laminations 2 punched from relatively thin magnetic material. The stator core member 1 has a generally cylindrical outer periphery 3 and a concentric bore 4 which defines the air gap with the rotor member (not shown) of the machine. A plurality of conventional winding slots 5 extend radially outward from the bore 4 in which the field windings 6 (FIGS. 2 and 3) are positioned.

In order to provide the requisite pressing, locating and checking surface, I provide a relatively thick end lamination 7 identical to the thin laminations 2 and congruently abutting at least one face of the stack of laminations, as shown in FIG. 4. In order to hold the stack of thin laminations 2 and the thick end lamination 7 in assembled relation, a plurality of spaced apart axially extending depressions 8 are formed in the outer periphery of the stator core member 1 and weld beads 9 are formed across the core in the depressions 8, as shown. The outer periphery 3 of the stator core member 1 is preferably turned in order to insure its concentricity and to obtain the proper outside dimension, this turning operation removing any portion of the weld beads 9 which may initially project beyond the outer periphery 3, as shown by the dashed line 10 in FIG. 4. Stator core member 1 may also be provided with a plurality of spaced apart axially extending openings 11 for accommodating through-bolts used for holding the stator core member and other apparatus such as a compressor, in assembled relation, and the individual laminations 2 and the end lamination 7 may also be provided with an indexing slot 12.

In order to provide a surface in a plane at a true right angle to the outer periphery 3 and the bore 4 of the stator core member 1, at least three projections or bosses 13 are formed from the surface of the thick lamination 7 on its side remote from its abutment with the thin laminations 2, the projections 13 preferably being evenly spaced about the outer periphery 3 and being located at the depressions 8, as shown. The faces of the projections 13 are then machined, as shown in the dashed line 14 in FIG. 4, at the same time as the outside diameter 3 of the stator core member 1 is machined, thereby providing a flat plane defined by the machined surfaces of the three projections 13 which is at two right angles or square with the outside diameter 3 and the bore 4. Reference to FIG. 4 will clearly show that the projections 13, after machining as at 14, still project axially beyond the portions 15 of the weld beads 9 which normally project beyond the faces of the core member 1, and therefore that the grinding operation previously employed to remove the projecting portions 15 of the weld beads 9 is no longer necessary.

Referring now specifically to FIGS. 2 and 5, the stator core member 1 is shown being pressed into a cylindrical outer shell member 16, which may be the compressor case of a hermetically sealed refrigeration system. It will be observed that the end 17 of the cylindrical shell 16 has a slightly larger inside diameter than does the inner portion 18, thus facilitating initial insertion of the stator core member 1 therein; subsequently pressing the stator member 1 in the direction shown by the arrow 32 into the region provides an increasingly tight force fit for the stator member 1 within the shell member 16. Here, the thick end lamination 7 with its projections 13 is arranged facing the end 17 of the outer shell 16 and is thus employed as the pressing surface for pressing the stator core member 1 into the shell 16. After the stator core member 1 has been thus initially inserted in the end 17 of the outer shell 16, the shell 16 is positioned within and tightly engaged by jig 19 having an end 20. A pressing member 21 is provided having an annular end surface 22 which abuts the machined projections 13 of the thick end laminations 7 of the stator core member 1 and thus serves concentrically to press the stator core member 1 into the shell 16 to the desired predetermined distance. Pressing member 21 is mounted upon an actuating member 23 which slidingly extends through a suitable bearing 24. It will be readily seen that the plane defined by the annular surface 22 of the pressing member 21 may be made square with the axis of movement of the actuating member 23 in the bearing 24, which in turn may be made concentric with the inside diameter of the outer shell member 16. Thus, with the plane of the machined projections 13 square with the outside diameter 3 of the stator core member 1, movement of the actuating member 23 in the direction shown by the arrow 32 causes the pressing member 21 to press the stator core member 1 into the outer shell member 16 a predetermined distance to the desired location in a concentric manner thus assuring ultimate concentricity of the bore 4 of the stator core member 1 with the rotor member when the compressor and rotor assembly is inserted in the shell member 16 from the other end 25.

Referring now specifically to FIGS. 3 and 6, the stator core member 1 is shown as being inserted within the outer shell member 16, which again may be a compressor case for a hermetically sealed refrigeration system. In this case, however, the stator core member 1 is to be inserted so that it abuts against an annular shoulder or rabbet surface 26. Thus, the thick end lamination 7 is disposed on the inner face of the stator core member 1 so that in its final location, the machined projections 13 abut against the annular rabbet surface 26. It is thus seen that since the plane defined by the machined projections 13 of the thick end lamination 7 is square with respect to the outside diameter 3 of the stator core member 1, and with the rabbet surface 26 being square with respect to the inside diameter of the shell member 16 into which the stator core member 1 is being inserted, when the stator core member 1 is finally located with all three projections 13 abutting the rabbet surface 26, concentricity of the final air gap when the rotor member is installed is assured.

In the embodiment of FIGS. 3 and 6, it is not necessary that the stator core member 1 be accurately positioned until it is finally located with its projections 13 abutting the rabbet surface 26 and thus, the stator core member 1 may be pressed into the outer shell member 16 by means of a pressing member 27 having three projections 28 which engage and press upon the other face 29 of the stator core member 1 remote from the thick lamination 7. Pressing member 27 may then have a ball joint connection 30 with actuating member 31 so that the pressing member 27 and stator core member 1 may accommodate themselves during the operation of pressing the stator core member 1 into the shell member 16, stator core member 1 being finally accurately located with the machine projections 13 abutting the rabbet surface 26 only at the end of the pressing operation. It will be understood, however, that the stator core member 1 may be provided with two thick end laminations 7 at each face thereof, each thick end lamination 7 having the machined projections 13 formed thereon and that thus the stator core member 1 of FIG. 3 may be pressed into the shell 16 by means of the pressing member 21 as shown in FIG. 2.

In an actual stator core member constructed in accordance with my invention for a ¼ horsepower hermetic refrigerator motor, the stator core member 1 had an outside diameter of 3 of 4.8 inches, a bore 4 of 2.4 inches, the thin laminations 2 had a thickness of .025 inch and the thick end lamination 7 had a thickness of .050 inch. The three projections 13 were formed with a radius of 3/32 inch and projected beyond the surface of the end lamination 7 by a distance of .062 inch, the machined surface defined by the projections 13 being a minimum of .125 inch in radial length. It will readily be seen that the three projections 13 are respectively spaced apart by 120°. However, it will be readily understood that more than three such projections may be employed; the minimum of three projections are, however, necessary in order to define a flat plane.

It will now be seen that my invention provides a stator core construction in which a flat plane at a true right angle with the outside diameter of the stator core member is provided, the projections 13 being capable of machining to provide the flat plane without the distortion of the laminations comprising the core which was encountered in prior attempts to machine the entire face of the thick end laminations. The flat plane defined by the machined projections 13 which is square with the outside diameter and the bore of the stator core member thus provides a surface for pressing the stator core member into an outer shell to a predetermined point and/or for abutment of the stator core member against a rabbet surface or some other surface within the outer shell. Furthermore, the machine projections 13 provide a flat plane which may be used in checking or measuring the final concentricity of the bore 4 of the machine.

While I have illustrated and described specific embodiments of my invention, further modifications and improvements will occur to those skilled in the art, and I desire therefore in the appended claims to cover all modifications which do not depart from the spirit and scope of this invention.

What is claimed is:

1. A stator core member for a dynamoelectric machine comprising: a stack of relatively thin laminations of magnetic material having a generally cylindrical outer periphery and a concentric bore; and an end lamination substantially thicker than said thin lamination and congruently abutting one face of said stack of laminations, said end lamination having at least three angularly spaced apart projections formed from its face opposite from said stack and adjacent its outer periphery, the faces of said projections being machined to a plane square with said outer periphery and bore of said stack of laminations.

2. A stator core member for a dynamoelectric machine comprising: a stack of relatively thin laminations of magnetic material; and an end lamination substantially thicker than said thin laminations and abutting one face of said stack of laminations, said end lamination having at least three evenly spaced projections formed from its face opposite from said stack and adjacent its outer periphery; said stack of laminations and said end lamination being held in assembled relation by at least one weld bead extending across said outer periphery, said projections extending axially beyond the end of said weld bead.

3. In a dynamoelectric machine: an outer shell member having an annular shoulder formed on its inner surface; and a stator core member comprising a stack of relatively thin laminations of magnetic material with one end lamination having at least three spaced apart projections formed on its face, said stator core member being positioned within said shell member with said projections abutting said shoulder.

4. In a dynamoelectric machine: an outer shell member having an annular shoulder formed on its inner surface; and a stator core member comprising: a stack of relatively thin laminations of magnetic material having a generally cylindrical outer periphery and a concentric bore; and at least one end lamination substantially thicker than said laminations and congruently abutting one face of said stack of laminations; the outer periphery of said stack of laminations having at least three evenly spaced axially extending depressions formed therein; and a weld bead extending axially in each of said depressions thereby securing said stack of laminations in assembled relation; said weld beads being no more than flush with said outer periphery of said stack of laminations and said end lamination; said end lamination having projections integrally formed from its face opposite from said stack respectively at said depressions; said projections having their faces machined to a plane square with said outer periphery and bore; said projections extending axially beyond the ends of said weld beads; and said stator core member being positioned within said shell member with said projections abutting said shoulder.

References Cited in the file of this patent

UNITED STATES PATENTS

| 2,763,796 | Happe | Sept. 18, 1956 |
| 2,774,897 | Matthews | Dec. 18, 1956 |
| 2,838,703 | Balke | June 10, 1958 |

FOREIGN PATENTS

| 77,691 | Switzerland | Oct. 1, 1918 |
| 734,630 | Germany | Apr. 20, 1943 |
| 876,777 | France | Aug. 17, 1942 |
| 950,481 | Germany | Oct. 11, 1956 |